United States Patent [19]

Eck et al.

[11] 4,059,661
[45] Nov. 22, 1977

[54] MANUFACTURE OF POLYVINYL CHLORIDE FOAMS

[75] Inventors: Herbert Eck; Gunter Weinhold; Manfred Hannebaum, all of Burghausen, Germany

[73] Assignee: Wacker-Chemie GmbH, Munich, Germany

[21] Appl. No.: 555,712

[22] Filed: Mar. 6, 1975

[30] Foreign Application Priority Data

Mar. 6, 1974 Germany .............................. 2410752

[51] Int. Cl.$^2$ ............................................. B29D 27/00
[52] U.S. Cl. ........................................ 264/54; 264/68; 264/DIG. 5; 264/DIG. 60
[58] Field of Search .................... 264/51, 54, DIG. 60, 264/DIG. 5; 259/7

[56] References Cited

U.S. PATENT DOCUMENTS

| 2,484,397 | 10/1949 | Barton | 264/DIG. 60 |
|---|---|---|---|
| 2,525,965 | 10/1950 | Smith | 264/DIG. 60 |
| 2,865,615 | 12/1958 | Slaughter | 259/7 X |
| 2,935,762 | 5/1960 | Walter et al. | 264/DIG. 60 |
| 2,969,960 | 1/1961 | Gurley | 259/7 |
| 3,164,377 | 1/1965 | Cramer | 259/7 |
| 3,173,978 | 3/1965 | Olson et al. | 264/DIG. 60 |
| 3,197,180 | 7/1965 | Bates | 259/7 |

FOREIGN PATENT DOCUMENTS

| 191,147 | 8/1957 | Austria | 259/7 |
|---|---|---|---|
| 718,826 | 9/1965 | Canada | 264/DIG. 60 |
| 1,457,182 | 12/1968 | Germany | 259/7 |
| 843,849 | 10/1960 | United Kingdom | 259/7 |

OTHER PUBLICATIONS

Yoran, Calvin S. and Robert J. Stockman, "Vinyl Foam," in *Rubber World*, Jan. 1959, pp. 542-549.
Cram, D. J.; C. M. Lavender; R. A. Reed and A. Schofield, "The Free Expansion of P.V.C. Using Azodicarbonamide," in *British Plastics*, Jan. 1961, pp. 24-29.
Morris, D. C.; K. M. Deal and R. R. Waterman, "Vanderbilt Process Vinyl Foam," in *Society of Plastics Engineers*, 20th Annual Technical Conference, Technical Papers, vol. X, Atlantic City, N. J., Jan. 27-30, 1964, pp. 1-3, (v-4).
Dunn, Jerome L. and Charles Kahn, "Flow Control of Plastisols," in 1970-1971 *Modern Plastics Encyclopedia,* vol. 47, No. 10A, Oct. 1970, pp. 372-380.
"SPI Plastics Engineering Handbook," Third Edition, New York, Reinhold, © 1960, pp. 188-197, 227-239.
Penn, W. S., "PVC Technology," Third Edition, Revised and Edited by W. V. Titow and B. J. Lanham, New York, Wiley-Interscience, © 1971, pp. 62-66, 393-418.

*Primary Examiner*—Philip Anderson
*Attorney, Agent, or Firm*—Burgess, Ryan and Wayne

[57] ABSTRACT

A process is provided for preparing soft polyvinyl chloride foam by agitating a foamable plastisol at high speed and under pressure.

15 Claims, 4 Drawing Figures

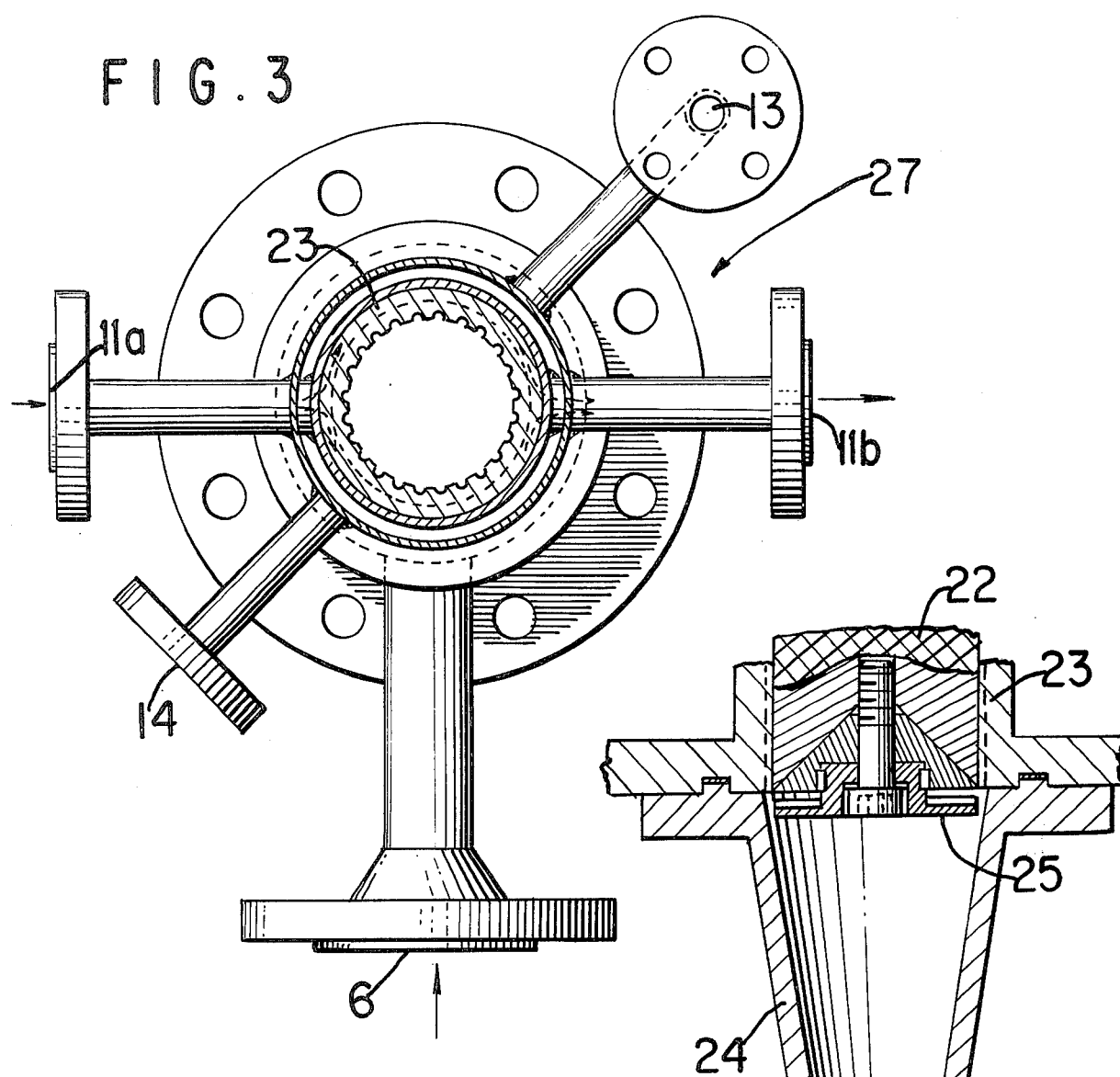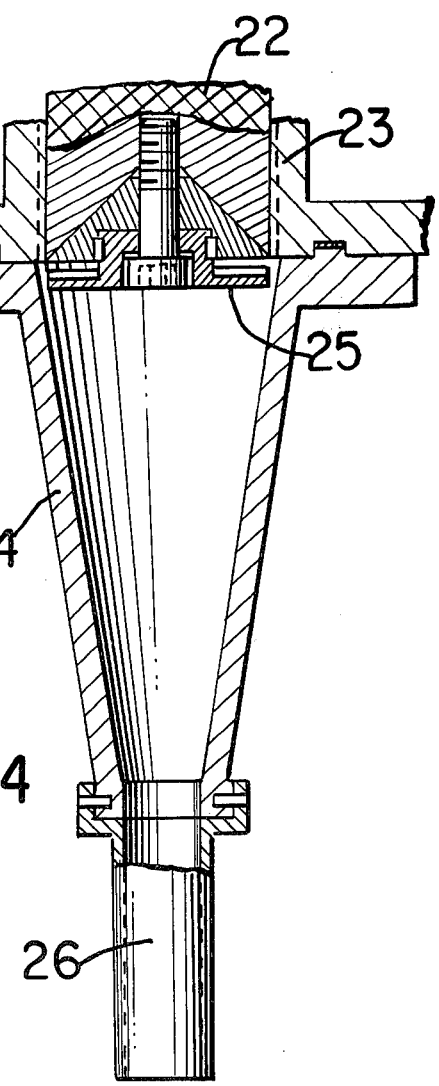

MANUFACTURE OF POLYVINYL CHLORIDE FOAMS

BACKGROUND OF THE INVENTION

The present invention relates to a process for the manufacture of soft polyvinyl chloride foams from foamable plastisols.

Gelling and foaming of polyvinyl chloride pastes is achieved by heating the paste, but this heating process can be difficult and complicated. These difficulties arise primarily due to the good insulation properties of polyvinyl chloride and especially, of polyvinyl chloride foams, which make it difficult to heat the inner parts of a large mass of polyvinyl chloride without overheating the outer parts.

One conventional method that is used for the manufacture of polyvinyl chloride foam is to heat the foamable paste in a gelatination channel. Apart from being both expensive and spaceconsuming, this method has the disadvantage that only relatively thin foam sheets can be produced because of the heating difficulties mentioned above. In any case, very long gelatination channels would be necessary for thicker sheets. Blocks of foam have had to be manufactured by more expensive methods using high frequency heating. A further method of foaming is by the use of a rotary mould for the production of foam articles. This method is again complex, and heating difficulties occur with larger shapes and articles.

SUMMARY OF THE INVENTION

The present invention is directed to a new and improved process for the manufacture of soft polyvinyl chloride foam by agitating a foamable plastisol at a high speed in a high speed mixing apparatus, under a pressure not in excess of about 15 atmospheres wherein at least about 60% of the heat necessary for foaming and gelatination is generated by friction within the mixing apparatus.

DETAILED DESCRIPTION OF THE INVENTION

The present invention provides a process for the manufacture of a soft polyvinyl chloride (as hereinafter defined) foam from a foamable plastisol, in which the heating difficulties mentioned above are substantially avoided. In this process, the plastisol is introduced into a high-speed mixing apparatus where it is agitated at high speed at a pressure not exceeding about 15 atmospheres gauge, and preferably not exceeding about 5 atmospheres gauge. This agitation results in the heat necessary for gelatination and foaming of the plastisol. The foam thus produced can, if desired, be allowed to foam and to cool further after leaving the mixing apparatus.

The mixing apparatus used for agitating the plastisols are high-speed mixers so that the heat generated by friction within the mixer is sufficient to cause foaming and gelling. The necessary speed of revolution, and thus circumferential speed, is dependent on the flow behavior of the particular plastisol but should in any case be higher than the speeds used for the extrusion of soft polyvinyl chloride powders and granulated materials. This means, for example, that with a rotor diameter of 60 mm, the speed of revolution should be at least about 250 rev/min and should preferably exceed about 500 rev/min.

The mixers need not be designed so as actually to convey the polyvinyl chloride through the apparatus, since the passage of the polyvinyl chloride can be controlled by means of pumps. It is important that the mixer used should be of a self-cleaning type since otherwise blockages would occur in the apparatus. The direction of feed of the plastisol into the mixer is not critical, it can be parallel to the axis of rotation or at an angle thereto.

Operation of the mixers can be carried out either at atmospheric pressure or under excess pressure, the latter being preferred in the case of physically foamed pastes. In the mixing zone, the plastisol is heated at a temperature in excess of about 70° C, preferably above about 50° C, to a temperature within the range of from about 120° to 240° C and preferably from about 140° to 200° C. It is important that the residence time in this zone does not exceed the critical period of stress for the particular plastisol.

Various types of mixing apparatus can be used in the present process. Conical rotary mixers that can be operated at high speed and that will, at such speeds, give a high internal friction can, for example, be used. The desired high internal friction can be achieved by an appropriate arrangement and construction of ribs and knobs on the conical rotor, and optionally on the stator components. Mixers of this type are described in, for example, U.S. Pat. Specification No. 2,969,960 and in Austrian Patent Specifications Nos. 191,147 and 200.327.

Multi-edged mixers, in which the plastisol needs to be pumped through the mixer, can be used. These are a special form of a single shaft spiral mixer; they may have no conveying effect or a low or negative conveying effect. Single-shaft interior mixers may be mentioned as an example; these consist of a multi-sided shaft that rotates, with little play, in a cylindrical housing. In order to be suitable for use in the present process, these mixers should of course be capable of being operated at high speeds, and should be so constructed that the pressure arising in them does not exceed about 15 atmospheres gauge, and preferably, does not exceed about 5 atmospheres gauge.

Centrally cylindrical rotary mixers of various types are particularly suitable for use in the present process. This may be a mixer in which a rotor, located in a cylindrical housing, is divided axially into cylindrical segments, alternate segments being of considerably smaller diameter than the housing, and the remaining alternative segments being of a diameter only slightly smaller than that of the housing. Both the rotor and the housing have smooth surfaces. A mixer of this type is described, for example, in British Patent Specification No. 843,849. An especially suitable centrally cylindrical rotary mixer is one with knobs, ribs, and the like, provided on the rotor and also on the stator, in such a manner that the highest points on the rotor and stator trace a uniform cylindrical slot having a breadth not greater than the height of the knobs, ribs or the like. Such a mixer is described in German Offenlegungsschrift No. 1,457,182, for example.

In all the mixers, the majority or all of the heat necessary for gelatination and foaming of the plastisol is supplied by internal friction, but up to about 40% of the heat can be supplied by external heating. The amount of heat supplied by friction depends both on the type of mixer also on the type of plastisol; plastisols having a pseudo-plastic flow behavior and better than those whose flow decreases under stress.

Various optional constituents, which may be either liquid or pasty, may be added to or mixed with the plastisol. This may be carried out either before introducing the plastisol into the mixer head, or within the mixer head at one or more points other than the point of entry of the plastisol. It is important, however, that any substances that will adversely affect the storage stability of the plastisol, or will cause a change in quality or color of the foam after a continuous process (e.g., pigments, plasticizers, blowing agents, and foaming agents) should be added to the plastisol either immediately before, or during its short residence time in the mixer.

The introduction into the mixer of the plastisol and of any other constituents introduced separately can be carried out by conventional means, for example, by means of spirals, geared pumps, centrifugal pumps, or piston pumps.

Agitation of the plastisol within the mixer can be carried out in such a way that the plastisol has been completely foamed prior to leaving the mixer, or it can be carried out such that foaming continues after the foam has been discharged from the mixer.

The foam can be introduced into hot or cold moulds or onto a conveyor. If desired, the mixer can be provided with a discharge device to form the foam into the desired shape.

The term "polyvinyl chloride" as used herein means not only homopolymers of vinyl chloride but also copolymers of vinyl chloride with up to about 15% by weight preferably from about 2 to 12% by weight, (relative to the weight of vinyl chloride) of one or more other olefinically unsaturated monomers. Examples of such monomers are vinyl esters, e.g., vinyl acetate, and vinyl propionate; vinyl and vinylidene halides, e.g., vinylidene chloride; unsaturated carboxylic acids and esters thereof, e.g., acrylic acid, maleic acid, fumaric acid, methacrylic acid, and their esters; acrylonitrile; and olefines, e.g., ethylene and propylene. The term "polyvinyl chloride" also includes mixtures of the above-mentioned homopolymers or copolymers with up to 100% by weight, preferably up to about 15% by weight, (relative to the weight of said homopolymers or copolymers) of other polymers, as for example, polyvinyl acetate, or polyethylene.

Plasticizers that can be used in the plastisol are, for example, carboxylic acid alkyl esters, e.g., dioctyl phthalate, dinonyl phthalate, dodecyl phthalate, butyl decyl phthalate, dicapryl phthalate, dioctyl adipate, and dioctyl sebacate; phosphoric acid alkyl esters, e.g., trioctyl phosphate; phosphoric acid aryl esters, e.g., tricresyl phosphate, cresyl diphenyl phosphate; alkyl sulphonic acid aryl esters, e.g., of phenol, or of cresol; epoxy-type plasticizers; and polymeric plasticizers, e.g., acrylonitrile-butadiene mixed polymers. Several plasticizers can be used in a combined plasticizer system.

The plastisols used in the present process may be those in which foaming is caused by chemical means or those in which foaming is caused physically. Either organic or inorganic chemical foaming agents can be used. Examples of inorganic chemical foaming agents are ammonium carbonate, sodium bicarbonate, and hydrides (e.g., sodium borohydride, lithium borohydride, or lithium aluminium borohydride) in conjunction with active hydrogen from, e.g., water or alcohols. Organic chemical foaming agents that can be used are those known in the art as, for example, various azo, hydrazo, nitroso, and azide compounds. The following examples should especially be mentioned; N,N'-dinitroso-pentamethylene-tetra-amine, p,p'-hydroxy-bis-benzenesulphonyl-hydrazide, p-toluene-sulphonyl-hydrazide, and azo-dicarboxylic amide. Suitable physical foaming agents are liquids that can be mixed in the plastisol and that will evaporate at the foaming temperature. Such liquids are, for example, fluorocarbons, chlorinated hydrocarbons, and water.

Various auxiliary substances or additions that can be included in the plastisols are, for example, heat stabilizers, light stabilizers, foam stabilizers, blowing stabilizers, lubricants, emulsifiers, pigments and fillers. These additions may be used in a conventional manner and in the usual amounts. The filler may be used in an amount of up to 100% by weight, relative to the weight of polyvinyl chloride.

The polyvinyl chloride soft foam manufactured according to the present process can be used for a variety of purposes. They can be used as moulded goods in a wide variety of shapes, for example, as cushions, car fittings (e.g., arm rests, protective covering, car seating), chair and armchair stuffing, sea-water-resistant floats (e.g., lifebelts, lifejackets), foam padding for armatures and crash-pads, toys (e.g., toy animals, dolls, and toy building blocks), and showcase dummies. They can also be used as block goods (e.g., mattresses and upholstery) and as strip and band goods in rolls. The foam can be used as flameproof insulating materials in buildings, in transportation, and in aircraft construction; it may insulate against heat, cold, or noise.

The main advantage of the present process is that the heat necessary for gelatination and foaming is generated internally. This means that heating channels and high frequency heating equipment previously necessary for the production of foam blocks and large moulded foam articles can be dispensed with. The complicated rotation casting process previously used for the production of moulded foam articles can also be dispensed with. Moreover, the present process enables moulding to be carried out at very low pressures, thus reducing moulding costs. The process of the invention is simple, can be operated without interruption, and is suited to mass production.

The invention will now be described, by way of example only, with reference to the accompanying drawings, in which:

FIG. 3 is a view from below of the mixing apparatus of FIG. 2; and

FIG. 4 is a longitudinal cross-section through a discharge nozzle attached to the mixing apparatus of FIG. 2.

Figure 1:
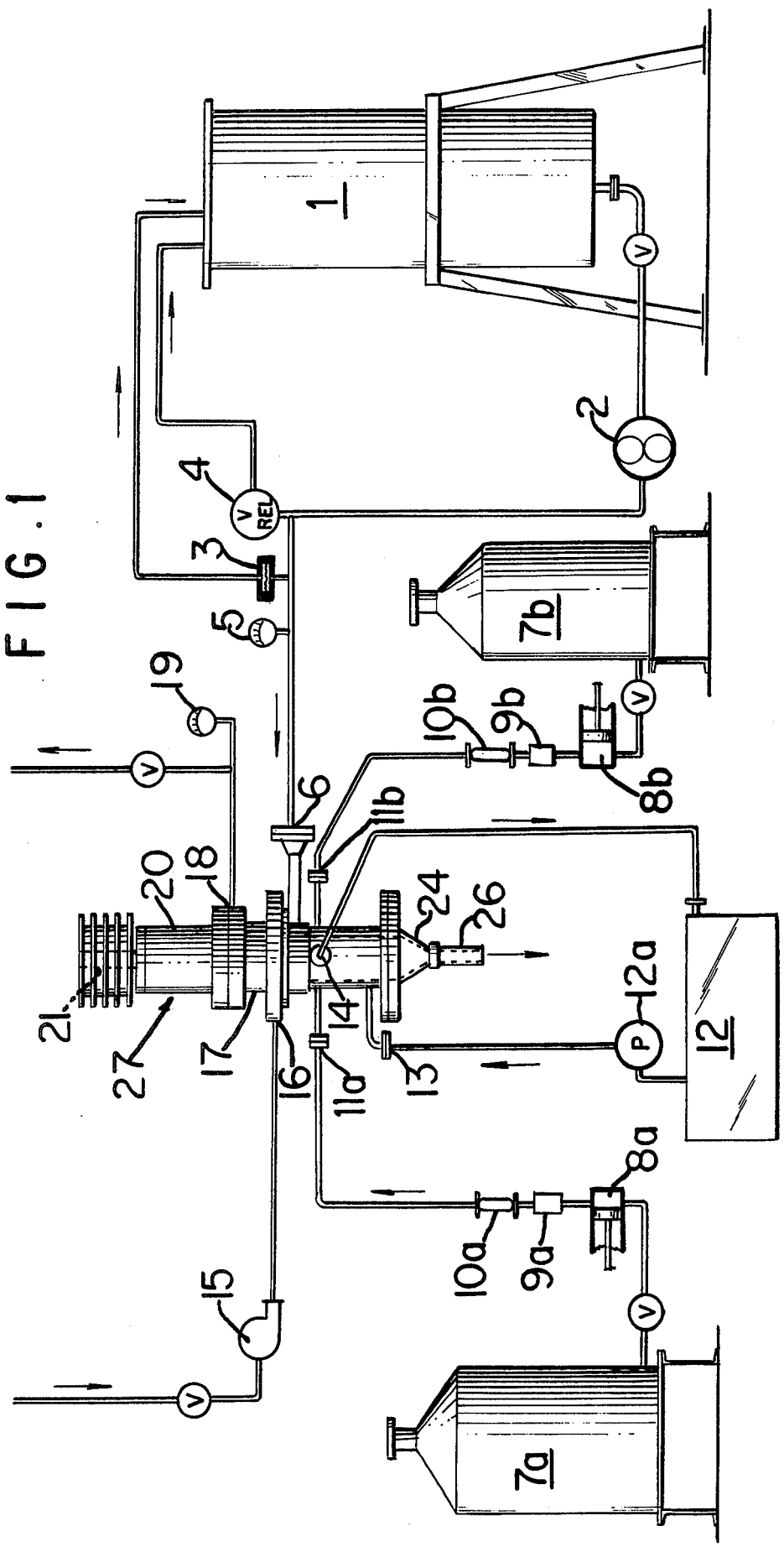
FIG. 1 is a schematic representation of a plant suitable for the manufacture of polyvinyl chloride foam using the process according to the invention.

Plastisol to be foamed is withdrawn from tank 1 by means of pump 2, and piped past safety membrane 3, safety valve 4, and manometer 5 to inlet 6 in the mixer. The safety membrane 3 and the safety valve 4 are set to pre-determined excess pressures, depending on the particular operating conditions. Plasticizers and other auxiliaries or additives are pumped from tanks 7a, 7b by means of dosing pumps 8a, 8b, and then through pulsation suppressors 9a, 9b and flow meters 10a, 10b to inlets 11a, 11b in the mixer. A heating liquid such as oil, can, when necessary, be heated in heater 12 and then be passed through inlet 13 to a jacket in the mixer casing, and then be returned through outlet 14 to the heater 12. A sealing liquid is passed from a tank (not shown) by means of a centrifugal pump 15 through inlet 16 into shaft seal 17 and then through outlet 18 from where it is returned to the tank (not shown) past manometer 19.

Figure 2:
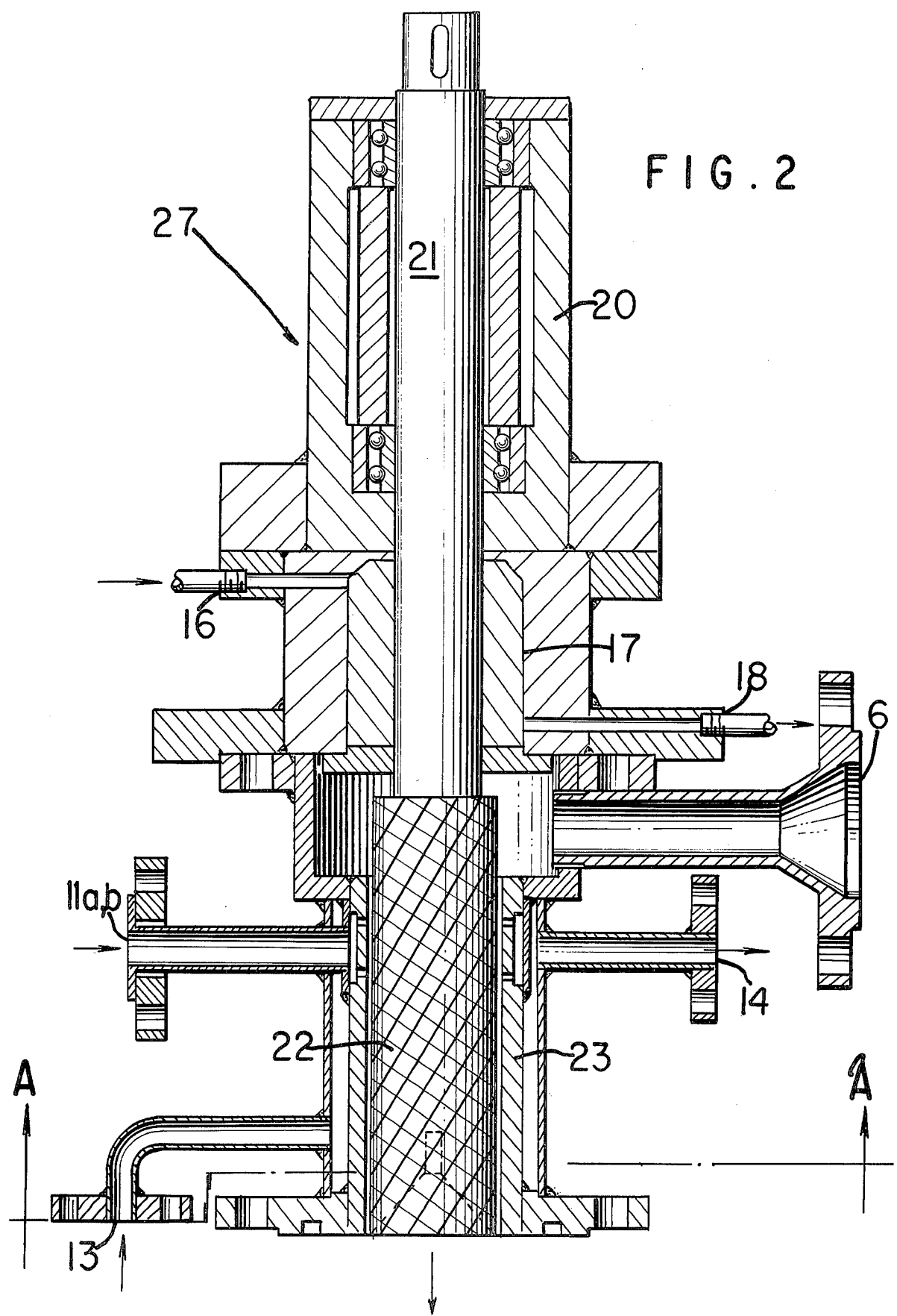
FIG. 2 is a longitudinal cross-section through the mixing apparatus used in the plant of FIG. 1.

The upper part of the mixer (FIG. 2) consists of a housing 20 carrying the bearings for the drive shaft 21, the lower part of which passes through the shaft seal 17. The drive-shaft 21 is driven at its upper end by an electric motor (not shown) and is connected at its lower end to rotor 22 which turns in stator 23 (FIG. 3).

In the apparatus shown, the mixer is provided with a (non-essential) discharge nozzle 24. A conveying wheel 25 is screwed onto the bottom end of the rotor 22 to reduce the pressure in the mixer and to increase the push-out pressure in the nozzle 24. The nozzle 24 is provided with an exit tube 26 for the foamed composition so as to improve the surface of the foam strands produced.

Various experiments, summarized in the table below, have been carried out using the plant shown in FIG. 1. In the mixer used, the stator 23 had longitudinal ribs in the direction of discharge, and the rotor 22 had knobs of rhombic cross section arranged spirally. The rotor used in Examples 7 and 11 to 19 was like that shown in FIG. 2 and was 25% longer than the rotor used in the other examples; this resulted in better mixing. Foaming was generally carried out without the nozzle 24 and without the use of increased pressure, except in Example 13, for the manufacture of foam strands, when the nozzle 24 was used and the pressure within the nozzle was 5 atmospheres gauge. In all the tests, the safety membrane 3 was set at 12 atmospheres gauge and the safety valve 4 at 6 atmospheres gauge. Water was used as the sealant in the shaft seal 17. The rotor was generally operated at about 4000 rev/min.

It should be evident that the following Examples are illustrative only and in no way limit the scope of the appended claims.

Five different polyvinyl chlorides were used in the tests (four homopolymers and one copolymer); in some examples, two different polyvinyl chlorides were mixed. The amount of plasticizer used varied from test to test, thus giving products of different hardnesses. Azo-dicarboxylic amide was used as a foaming agent in most cases; when using more than 6 p.b.w. (parts by weight) of foaming agent per 100 p.b.w. of polyvinyl chloride, the resulting foam shapes had a density of less than 0.21 g/cm³. The azodicarboxylic amide, zinc oxide, and dibasic lead phthalate were mixed with equal parts by weight of bis-2-ethylhexyl phthalate. Interior and exterior lubricants were used to control the flow behavior of the plastisol as desired. A short afterheating, e.g., by radiation of the foam after exit from the mixer, was found to be advantageous in some cases, particularly when manufacturing relatively thin foam bodies or strands; this prevented cooling from being too rapid and ensured that the outer layers foamed completely. From 0% (in Example 19) up to about 35% of the necessary heat was supplied by external heating, the remainder of the heat being generated by friction within the mixer. The viscosities given in the following table were measured by a viscometer from the firm Haake of the Federal Republic of Germany. The foam bodies manufactured in these Examples had flawless contours.

The following abbreviations are used in the table:
PVC polyvinyl chloride homopolymer
VC vinyl chloride
VA vinyl acetate
pbw parts by weight
med medium
v.f. very fine

| Example No. | 1 | 2 | 3 | 4 | 5 | 6 | 7 | 8 | 9 |
|---|---|---|---|---|---|---|---|---|---|
| pasteable emulsion PVC, K-value 68 (pbw) | 100 | 100 | 100 | — | — | — | — | — | — |
| pasteable suspension PVC, K-value 70 (pbw) | — | — | — | 70 | 30 | 30 | 30 | — | — |
| pasteable suspension PVC, K-value 68 (pbw) | — | — | — | — | — | — | — | 100 | 100 |
| pasteable emulsion PVC, K-value 70 (pbw) | — | — | — | 30 | 70 | 70 | 70 | — | — |
| 95 % VC/5 % VA copolymer (emulsion) (pbw) | — | — | — | — | — | — | — | — | — |
| polyacrylate (pbw) | — | — | — | — | — | 2 | 3 | — | — |
| benzyl butyl phthalate (pbw) | 25 | 25 | 25 | 25 | 40 | 40 | 40 | 25 | 25 |
| bis-(2-ethylhexyl) phthalate (pbw) | 24 | 28 | 28 | 46 | 57 | 67 | 65 | 88 | 33 |
| butyl benzyl phthalate + 7911 phthalate (pbw) | — | — | — | — | — | — | — | — | — |
| azodicarbonamide (50 % dioctyl phthalate) (pbw) | — | 4 | 4 | 4 | 6 | 8 | 12 | 4 | 4 |
| 5-morpholyl-1,2,3,4-thiatriazole (pbw) | 8 | — | — | — | — | — | — | — | — |
| sodium bicarbonate (pbw) | — | — | — | — | — | — | — | — | — |
| zinc oxide (50 % dioctyl phthalate) (pbw) | 4 | — | — | — | — | — | — | — | — |
| Cd/Zn blowing agent (pbw) | — | 2 | 2 | — | — | — | — | — | — |
| Ba/Zn blowing agent (pbw) | — | — | — | — | — | — | — | 2 | — |
| Cd/Zn blowing agent (pbw) | — | — | — | 2 | 2 | — | — | — | 2 |
| dibasic lead phthalate (50 % dioctyl phthalate) (pbw) | — | — | — | — | — | 10 | 14 | — | — |
| dibutyl tin mercaptide (pbw) | 2 | 2 | 2 | 2 | 3 | — | — | 2 | 2 |
| epoxidised soya bean oil (pbw) | 3 | 3 | 3 | 3 | 3 | 3 | 3 | 3 | 3 |
| liquid Ba/Cd stabiliser (pbw) | — | — | — | — | — | — | — | — | — |
| partial fatty acid ester of glycerine (pbw) | 1 | 1 | — | — | 1.5 | — | — | — | 1 |
| paraffin oil (pbw) | — | — | 0.5 | 0.5 | 0.5 | 0.5 | 0.5 | 0.5 | — |
| titanium dioxide (pbw) | 2.5 | 2.5 | 2.5 | 2.5 | 2.5 | 2.5 | 2.5 | 2.5 | 2.5 |
| viscosity: temperature (° C) | | | 28 | 23 | 24 | 22 | 22 | 24 | |
| measured at 47 rev/min (cp) | | | 2640 | 2400 | 13600 | 20000 | 19200 | 1200 | |
| measured at 188 rev/min (cp) | | | 2550 | 9000 | 9000 | 14700 | 14000 | 1080 | |
| mixing head temperature (° C) | 239 | 245 | 230 | 268 | 292 | 255 | 291 | 220 | 243 |
| paste metering with spiral | — | — | — | — | — | — | — | — | — |
| paste metering with geared pump | x | x | x | x | x | x | x | x | x |
| Throughput of paste (kg/h) | 40 | 50 | 33 | 30 | 30 | 39 | 36 | 33 | 45 |
| Additional plasticiser (dioctyl phthalate) metered into mixing head) (kg/h) | — | — | — | 1.0 | 1.1 | 3.1 | 2.4 | — | — |
| Additional plasticiser (butyl benzyl phthalate) metered into mixing head (kg/h) | — | — | — | — | — | — | — | 3.2 | — |
| Additional plasticiser (butyl benzyl phthalate) metered before mixing head (kg/h) | — | — | — | — | — | — | — | — | — |
| Normal mixing zone | x | x | — | — | — | — | — | x | x |
| Extended mixing zone | — | — | x | x | x | x | x | — | — |
| block foam : bulk density (g/cm³) | 0.38 | 0.42 | — | — | — | — | — | 0.46 | 0.30 |
| porous structure | med | med | — | — | — | — | — | v.f. | fine |

-continued

| | 10 | 11 | 12 | 13 | 14 | 15 | 16 | 17 | 18 | 19 |
|---|---|---|---|---|---|---|---|---|---|---|
| shaped foam : bulk density (g/cm³) | — | — | 0.36 | 0.58 | 0.61 | 0.43 | 0.20 | — | — | |
| porous structure | — | — | v.f. | med | med | fine | v.f. | — | — | |
| foam strands : bulk density (g/cm³) | — | — | — | — | — | — | — | — | — | |
| porous structure | — | — | — | — | — | — | — | — | — | |
| Example No. | 10 | 11 | 12 | 13 | 14 | 15 | 16 | 17 | 18 | 19 |
| pasteable emulsion PVC, K-value 68 (pbw) | — | — | — | — | — | — | — | — | — | — |
| pasteable suspension PVC, K-value 70 (pbw) | — | — | — | — | — | — | — | — | — | — |
| pasteable suspension PVC, K-value 68 (pbw) | 60 | 60 | 60 | 55 | — | — | — | — | — | 60 |
| pasteable emulsion PVC, K-value 70 (pbw) | — | — | — | 45 | 100 | — | — | — | — | — |
| 95 % VC/5 % VA copolymer (emulsion) (pbw) | 40 | 40 | 40 | — | — | 100 | 100 | — | 30 | 40 |
| polyacrylate (pbw) | — | — | — | — | 2 | — | — | — | — | — |
| benzyl butyl phthalate (pbw) | 36 | 25 | 25 | — | 50 | 25 | 25 | 25 | 25 | 25 |
| bis-(2-ethylhexyl phthalate (pbw) | 33 | 48 | 46 | 9 | 74 | 56 | 47 | 49 | 36 | 52 |
| butyl benzyl phthalate + 7911 phthalate (pbw) | — | — | — | 80 | — | — | — | — | — | — |
| azodicarbonamide (50 % dioctyl phthalate)(pbw) | 4 | 4 | 4 | 6 | 10 | 4 | 4 | 6 | 12 | — |
| 5-morpholyl-1,2,3,4-thiatriazole (pbw) | — | — | — | — | — | — | — | — | — | — |
| sodium bicarbonate (pbw) | — | — | — | — | — | — | — | — | — | 3 |
| zinc oxide (50 % dioctyl phthalate) (pbw) | — | — | — | — | — | — | — | — | — | — |
| Cd/Zn blowing agent (pbw) | — | — | — | — | — | — | — | — | — | — |
| Ba/Zn blowing agent (pbw) | 2 | — | — | — | — | — | — | 2 | 3 | — |
| Cd/Zn blowing agent (pbw) | — | — | 2 | 2 | — | 2 | 2 | — | — | — |
| dibasic lead phthalate (50 % dioctyl phthalate) (pbw) | — | — | — | — | 10 | — | — | — | — | — |
| dibutyl tin mercaptide (pbw) | 2 | 2 | 2 | 2 | — | 2 | 2 | 2 | 2 | — |
| epoxidised soya bean oil (pbw) | 3 | 3 | 3 | 3 | 3 | 3 | 3 | 3 | 3 | 3 |
| liquid Ba/Cd stabiliser (pbw) | — | — | — | — | — | — | — | — | — | 4 |
| partial fatty acid ester of glycerine (pbw) | — | — | — | — | — | — | — | — | — | — |
| paraffin oil (pbw) | 0.5 | 0.5 | 0.5 | 0.5 | 0.5 | 0.5 | 0.5 | 0.5 | 0.5 | 0.5 |
| titanium dioxide (pbw) | 2.5 | 2.5 | 2.5 | 2.5 | 2.5 | 2.5 | 2.5 | 2.5 | 2.5 | 2.5 |
| viscosity : temperature (° C) | 27 | 26 | 31 | 20 | 20 | 20 | 22 | 29 | 28 | 30 |
| measured at 47 rev/min (cp) | 7600 | 7200 | 3120 | 12400 | 32000 | 10000 | 13600 | 13200 | 40000 | 7600 |
| measured at 188 rev/min (cp) | 7800 | 7800 | 3570 | 15000 | 17000 | 9500 | 13300 | 11300 | 28000 | 7500 |
| mixing head temperature (° C) | 247 | 200 | 175 | 260 | 275 | 189 | 225 | 290 | 240 | 135 |
| paste metering with spiral | — | — | x | — | — | — | — | — | — | — |
| paste metering with geared pump | x | x | — | x | x | x | x | x | x | x |
| Throughput of paste (kg/h) | 66 | 33 | 36 | 36 | 30 | 30 | 48 | 33 | 36 | 40 |
| Additional plasticiser (dioctyl phthalate) metered into mixing head (kg/h) | — | 3.0 | 2.7 | 9.0 | 3.2 | 4.6 | 3.1 | 3.4 | 3.6 | 5.4 |
| Additional plasticiser (butyl benzyl phthalate) metered into mixing head (kg/h) | — | — | — | — | — | — | — | — | — | — |
| Additional plasticiser (butyl benzyl phthalate) metered before mixing head (kg/h) | 3.0 | — | — | — | — | — | — | — | — | — |
| Normal mixing zone | x | — | — | — | — | — | — | — | — | — |
| Extended mixing zone | — | x | x | x | x | x | x | x | x | x |
| block foam : bulk density (g/cm³) | 0.31 | — | — | — | — | — | — | 0.24 | 0.28 | — |
| porous structure | fine | — | — | — | — | — | — | med | med rough | — |
| shaped foam : bulk density (g/cm³) | 0.29–0.44 | 0.33 | 0.47 | 0.52 | 0.29 | 0.41 | 0.40 | 0.38 | 0.27 | 0.51 |
| porous structure | fine | fine | fine | fine | fine | fine | fine | fine | med rough | med |
| foam strands : bulk density (g/cm³) | | | | 0.62 | | | | | | |
| porous structure | | | | v.f.; very uniform | | | | | | |

What we claim is:

1. A process for producing a soft polyvinyl chloride foam which comprises feeding a foamable soft polyvinyl chloride plastisol to a high speed mixing zone, agitating said foamable soft polyvinyl chloride plastisol at high speed in said high speed mixing zone at a pressure not exceeding about 15 atmospheres gauge to thereby generate, by friction, at least about 60 percent of the heat necessary for foaming and gelatination of said plastisol and cause foaming and gelling of said plastisol within said mixing zone, and discharging an at least partially gelled and at least partially foamed polyvinyl chloride from said mixing zone.

2. A process as claimed in claim 1, wherein said pressure does not exceed about 5 atmospheres.

3. A process as claimed in claim 1, wherein said mixing apparatus is a centrally cylindrical rotary mixer.

4. A process as claimed in claim 1, wherein said plastisol is one having pseudo-plastic flow behavior.

5. A process as claimed in claim 1, wherein said mixing apparatus is provided with a discharge device to shape the foam.

6. A process as claimed in claim 1, wherein foaming is completed within said mixing apparatus.

7. A process as claimed in claim 1, wherein the foaming continues after the foam has left the mixing apparatus.

8. A process as claimed in claim 7, wherein said foam is heated after leaving the mixing apparatus.

9. A process as claimed in claim 1, wherein said plastisol includes a foaming agent selected from the group consisting of ammonium carbonate, sodium bicarbonate, a hydride in conjunction with active hydrogen, N,N'-dinitroso-pentamethylene-tetra-amine, p,p'-hydroxy-bis-benzenesulphonyl-hydrazide, p-toluenesulphonyl-hydrazide, and azodicarboxylic amide.

10. A process according to claim 9 wherein said foaming agent is azo-dicarboxylic amide.

11. A process according to claim 1, wherein said polyvinyl chloride is a homopolymer of vinylchloride.

12. A process according to claim 1 wherein said polyvinyl chloride is a copolymer of vinylchloride.

13. A process according to claim 1 wherein about 6 parts by weight of a foaming agent per 100 parts by weight of polyvinyl chloride are agitated together.

14. A process as claimed in claim 1, wherein at least one auxiliary substance selected from the group consisting of heat stabilizers, light stabilizers, foam stabilizers, blowing stabilizers, lubricants, emulsifiers, pigments, and fillers is added to the plastisol within the mixing apparatus.

15. A process as claimed in claim 1, wherein the plastisol comprises up to 100% by weight, relative to the polyvinyl chloride, of a filler.

* * * * *